US007082407B1

(12) United States Patent
Bezos et al.

(10) Patent No.: US 7,082,407 B1
(45) Date of Patent: Jul. 25, 2006

(54) PURCHASE NOTIFICATION SERVICE FOR ASSISTING USERS IN SELECTING ITEMS FROM AN ELECTRONIC CATALOG

(75) Inventors: Jeffrey P. Bezos, Seattle, WA (US); Joel R. Spiegel, Woodinville, WA (US); Jon McAuliffe, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 487 days.

(21) Appl. No.: 09/377,322

(22) Filed: Aug. 19, 1999

Related U.S. Application Data

(60) Provisional application No. 60/128,557, filed on Apr. 9, 1999.

(51) Int. Cl.
*G06Q 30/00* (2006.01)
(52) U.S. Cl. ....................................................... 705/26
(58) Field of Classification Search ................. 705/26, 705/27
See application file for complete search history.

(56) References Cited

U.S. PATENT DOCUMENTS

| | | | |
|---|---|---|---|
| 4,996,642 A * | 2/1991 | Hey ............................. 705/27 |
| 5,459,306 A | 10/1995 | Stein et al. |
| 5,583,763 A * | 12/1996 | Atcheson et al. |
| 5,737,726 A | 4/1998 | Cameron et al. |
| 5,749,081 A * | 5/1998 | Whiteis ....................... 707/102 |
| 5,790,426 A * | 8/1998 | Robinson |
| 5,790,935 A | 8/1998 | Payton |
| 5,794,210 A | 8/1998 | Goldhaber et al. |
| 5,796,395 A * | 8/1998 | de Hond |
| 5,918,014 A * | 6/1999 | Robinson |
| 5,918,213 A * | 6/1999 | Bernard et al. |
| 5,956,693 A | 9/1999 | Geerlings |
| 5,974,396 A | 10/1999 | Anderson et al. |
| 6,035,283 A | 3/2000 | Rofrano |
| 6,041,311 A * | 3/2000 | Chislenko et al. |
| 6,049,777 A * | 4/2000 | Sheena et al. ................ 705/10 |
| 6,064,980 A * | 5/2000 | Jacobi et al. |
| 6,078,740 A | 6/2000 | DeTreville |
| 6,078,892 A | 6/2000 | Anderson et al. |
| 6,092,049 A * | 7/2000 | Chislenko et al. ............ 705/10 |
| 6,101,486 A | 8/2000 | Roberts et al. |

(Continued)

FOREIGN PATENT DOCUMENTS

WO    WO 03/077112 A1 *  9/2003

OTHER PUBLICATIONS

Balabanovic et al "Fab: Content-based, collaborative recommendation" Communications of ACM, vol. 40, No. 3, Mar. 1997, pp. 66-72. Retrieved from Dialog Feb. 9, 2002. Retrieved from Dialog: File 15, Accession No. 01378974.*

(Continued)

*Primary Examiner*—Jeffrey A. Smith
*Assistant Examiner*—Naeem Haq
(74) *Attorney, Agent, or Firm*—Knobbe, Martens, Olson & Bear LLP

(57) ABSTRACT

A computer service monitors online browsing of an electronic catalog by a user, and notifies the user when a catalog item being accessed is one that has been purchased by an affiliated user, such as a contact or a fellow community member. The notification may include the contact information of the affiliated user, and/or may provide an option to send a message to the affiliated user.

10 Claims, 11 Drawing Sheets

U.S. PATENT DOCUMENTS

| | | | |
|---|---|---|---|
| 6,101,487 | A | 8/2000 | Yeung |
| 6,112,186 | A * | 8/2000 | Bergh et al. .................... 705/10 |
| 6,195,657 | B1 | 2/2001 | Rucker et al. |
| 6,317,722 | B1 * | 11/2001 | Jacobi et al. |
| 6,321,179 | B1 * | 11/2001 | Glance et al. ............... 702/189 |
| 6,321,221 | B1 * | 11/2001 | Bieganski ....................... 707/5 |
| 6,389,372 | B1 * | 5/2002 | Glance et al. ............... 702/189 |
| 6,415,368 | B1 * | 7/2002 | Glance et al. ............... 711/158 |
| 6,460,036 | B1 | 10/2002 | Herz |
| 6,484,123 | B1 * | 11/2002 | Srivastava ................... 702/181 |
| 6,487,541 | B1 * | 11/2002 | Aggarwal et al. ............. 705/26 |
| 2001/0013009 | A1 * | 8/2001 | Greening et al. ............. 705/10 |

OTHER PUBLICATIONS http://web.archive.org/web/19981212023239/http://www.bizrate.com/.* http://www.amazon.com/exec/obidos/tg/stores/detail/-/books/0060155477/customer-reviews/4/r.*

Venkatraman et al "Real strategies for virtual organizing" Sloan Management Review, vol. 40, No. 1, Fall 1998, pp. 33-48. Retrieved from Dialog on Feb. 9, 2002. Retrieved from Dialog: File 15, Accession No. 01721863.*

Konstan et al "Applying Collaborative Filtering to Usernet News" Communications of the ACM, vol. 40, No. 3, Mar. 1997, pp. 77-87.* http://cgi.ebay.com/aw-cgi/eBayISAPI.dll?ViewItem&item=1333369241.*

No Author, "Just Add People—Collaborative filtering brings human input to information retrieval in the enterprise.", Information Week, Dec. 22, 1997, p. 65. Retrieved from Dialog File: 9, Acc#: 02024097.*

Miyahara et al "Collaborative information filtering in cooperative communities", Journal of Computer Assisted Learning, 1998.*

Shardanand et al "Social Information Filtering: Algorithms for Automating 'Word of Mouth'", MIT Media-Lab, Jun. 3, 1999.*

Korth et al "Database System Concepts", Second Edition, 1991, pp. 23-54.*

International Search Report, dated Sep. 15, 2000 for counterpart application PCT/US00/400777 (2 pages).

Nelson Wang, *Keep In Touch: New Breed of Site Links People by Common Interest,* Web Week, dated Nov. 10, 1997. (5-page web document).

Whit Andrews, *Building Communities As Way of Building Sales,* Web Week, dated Dec. 16, 1996. (2-page Web document).

Tony Silber, *Why Community Sites Are Hot,* Internet World, dated Feb. 16, 1998. (3-page Web document).

* cited by examiner amazon.com

Community Interests–Signup

Hello, Erin Indianer.

Tell us about the communities you belong to, and we will periodically tell you about what others in your communities are buying: (hold down "CTRL" to select more than one):

| | |
|---|---|
| College/University: | American University ▼ |
| Local community groups: | Aberdeen Rotary Club ▼ |
| Local outdoors clubs: | Cascade Bicycle Club ▼ |
| ⋮ | ⋮ |
| Professional Organizations: | American Medical Association ▼ |

*Click here* to add a community to the list or to create a private community

☐ Check this box if you would like to know the names and e-mail addresses of others in your communities that have recently purchased the item you are looking at. By selecting this option, you authorize Amazon.com to send your name and e-mail address to other community members. *Click Here* to limit your participation to specific communities and/or product categories ☐ Check this box if you would like to receive e-mail notifications of hot sellers in your communities. *Click Here* to limit your participation to specific communities an/or product categories ☐ Check this box if you would like to receive an e-mail notification whenever a member of one of your communities purchases a product, and to allow others in your communities to monitor your purchases (participating communities only). *Click Here* to limit your participation to specific communities and/or product categories

[Submit]

FIG. 1

PURCHASE NOTIFICATION SERVICE FOR ASSISTING USERS IN SELECTING ITEMS FROM AN ELECTRONIC CATALOG

PRIORITY CLAIM

This application claims the benefit of U.S. Provisional Application No. 60/128,557, filed Apr. 9, 1999.

FIELD OF THE INVENTION

This invention relates to electronic commerce and information filtering. More specifically, this invention relates to information processing methods for assisting online users in identifying and evaluating items from a database of items based on user purchase histories or other historical data.

BACKGROUND OF THE INVENTION

Web sites of online merchants commonly provide various types of informational services for assisting users in evaluating the merchants' product offerings. Such services can be invaluable to an online customer, particularly if the customer does not have the opportunity to physically inspect the merchants' products or talk to a salesperson.

One type of service involves recommending products to users based on personal preference information. Such preference information may be specified by the user explicitly, such as by filling out an online form, or implicitly, such as by purchasing or rating products. The personalized product recommendations may be communicated to the customer via an email message, a dynamically-generated Web page, or some other communications method.

Two types of algorithmic methods are commonly used to generate the personalized recommendations—collaborative filtering and content-based filtering. Collaborative filtering methods operate by identifying other users with similar tastes, and then recommending products that were purchased or highly rated by such similar users. Content-based filtering methods operate by processing product-related content, such as product descriptions stored in a database, to identify products similar to those purchased or highly rated by the user. Both types of methods can be combined within a single system.

Web sites also commonly implement services for collecting and posting subjective and objective information about the product tastes of the online community. For example, the Web site of Amazon.com, the assignee of the present application, provides a service for allowing users to submit ratings (on a scale of 1–5) and textual reviews of individual book, music and video titles. When a user selects a title for viewing, the user is presented with a product detail page that includes the title's average rating and samples of the submitted reviews. Users of the site can also access lists of the bestselling titles within particular product categories, such as "mystery titles" or "jazz CDs."

SUMMARY OF THE INVENTION

One problem with the above-described methods is that they fail to take into consideration the level of acceptance the merchant's products have attained within specific user communities. As a result, products that are very popular within the communities to which the user belongs or is affiliated may never be called to the user's attention. For example, a programming book that has attained disparate popularity among Microsoft™ Corporation programmers may never be called to the attention of other programmers, including other programmers at Microsoft™ Corporation. Even where such products are known to the user, the user's ignorance of a product's level of acceptance within specific communities, and/or the user's inability to communicate with users who are familiar with the product, can contribute to a poor purchase decision.

The present invention addresses these and other problems by providing various computer-implemented services for assisting users in identifying and evaluating items that have gained acceptance within particular user communities. The services are preferably implemented as part of a Web site system, but may alternatively be implemented as part of an online services network, interactive television system, or other type of information system. In one embodiment, the services are provided on the Web site of an online store to assist users in identifying and evaluating products, such as book titles.

The communities may include explicit membership communities that users can join through a sign-up page. The explicit membership communities may include, for example, specific universities, outdoors clubs, community groups, and professions. Users may also have the option of adding explicit membership communities to the system, including communities that are private (not exposed to the general user population). The communities may additionally or alternatively include implicit membership communities for which membership is determined without any active participation by users. Examples of implicit membership communities include domain-based communities such as Microsoft.com Users (determined from users' email addresses), geographic region based communities such as New Orleans Area Residents (determined from users' shipping addresses), and communities for which membership is based on users' purchase histories.

In accordance with one aspect of the invention, a service is provided for automatically generating and displaying community-based popular items lists. The popular items lists are preferably in the form of bestseller lists that are based on sales activities over a certain period of time, such as the last two months. By viewing these lists, users can readily identify the bestselling products within specific communities. In one embodiment, the bestseller lists for the communities of which the user is a member are automatically displayed on a personalized Web page. The bestseller lists could also be communicated by email, fax, or another communications method.

One feature of the invention involves generating bestseller lists that are based solely on Internet domains, without requiring any active user participation. These domain-based bestseller lists may be displayed automatically on the home page or other area of the Web site.

Another feature of the invention involves generating and displaying bestseller lists for "composite communities," which are communities formed from multiple implicit and/or explicit membership communities. Using this feature, a user can, for example, view a bestseller list for the composite community All U.S. Bicycle Clubs, or Domains of all Software Companies. In one embodiment, users can define their own, personal composite communities (such as by selecting from a list of non-composite communities) to create custom bestseller lists.

In accordance with another aspect of the invention, a service is provided for notifying users interested in particular products of other users that have purchased the same or similar products. In one embodiment, the service is implemented by providing user contact information on product detail pages. For example, when a user views a product detail page for a particular product (such as a kayak), the detail page may be customized to include the names and email addresses of other members of the user's community (such as a kayaking club) that recently purchased the same product. If any of these other members is online, the user may be presented the option to send an instant message or otherwise chat online with such members. In one implementation, users can opt to expose their contact information to other community members (and thus participate in the service) on a community-by-community basis. A variation of this service involves notifying users interested in particular merchants (e.g., sellers on an online auction site) of the contact information of other users (preferably fellow community members) that have engaged in business with such merchants.

In accordance with yet another aspect of the invention, a notification service is provided for informing users of popular products within their respective communities. The popular products may be identified, for example, based on the popularity of the product within the community relative to the product's popularity within the general user population, or based simply on the number of units recently purchased within the community relative to the number of community members. In one embodiment, users can also request to be notified of all purchases made within their respective communities. The popular product and purchase event notifications are preferably sent by email (to community members that have not yet purchased the product), but may alternatively be communicated using a personalized Web page of other method. The notifications may include information for assisting users in evaluating the products, such as the number of community members that have purchased the product and/or contact information of such other users.

In accordance with another aspect of the invention, the purchase histories of users are processed to identify the "characterizing purchases" of a community, and these characterizing purchases are used to recommend items within that community. Specifically, the purchase history data of the community is compared to the purchase history data of a general user population to identify a set of items purchased within the community that distinguish the community from the general user population. Items are then implicitly or explicitly recommended to members of the community from this set, such as through popular items lists or email notifications.

The various features of the invention can also be used in the context of a system in which users merely view, download, and/or rate items without making purchases. In such systems, each viewing, downloading and/or rating event (or those that satisfy certain criteria) can be treated the same as a purchase event.

BRIEF DESCRIPTION OF THE DRAWINGS

A set of services which implement the various features of the invention will now be described with reference to the drawings of a preferred embodiment, in which:

FIG. 1 illustrates an example sign-up page for specifying community memberships and service preferences;

DETAILED DESCRIPTION OF A PREFERRED EMBODIMENT

Figure 2:
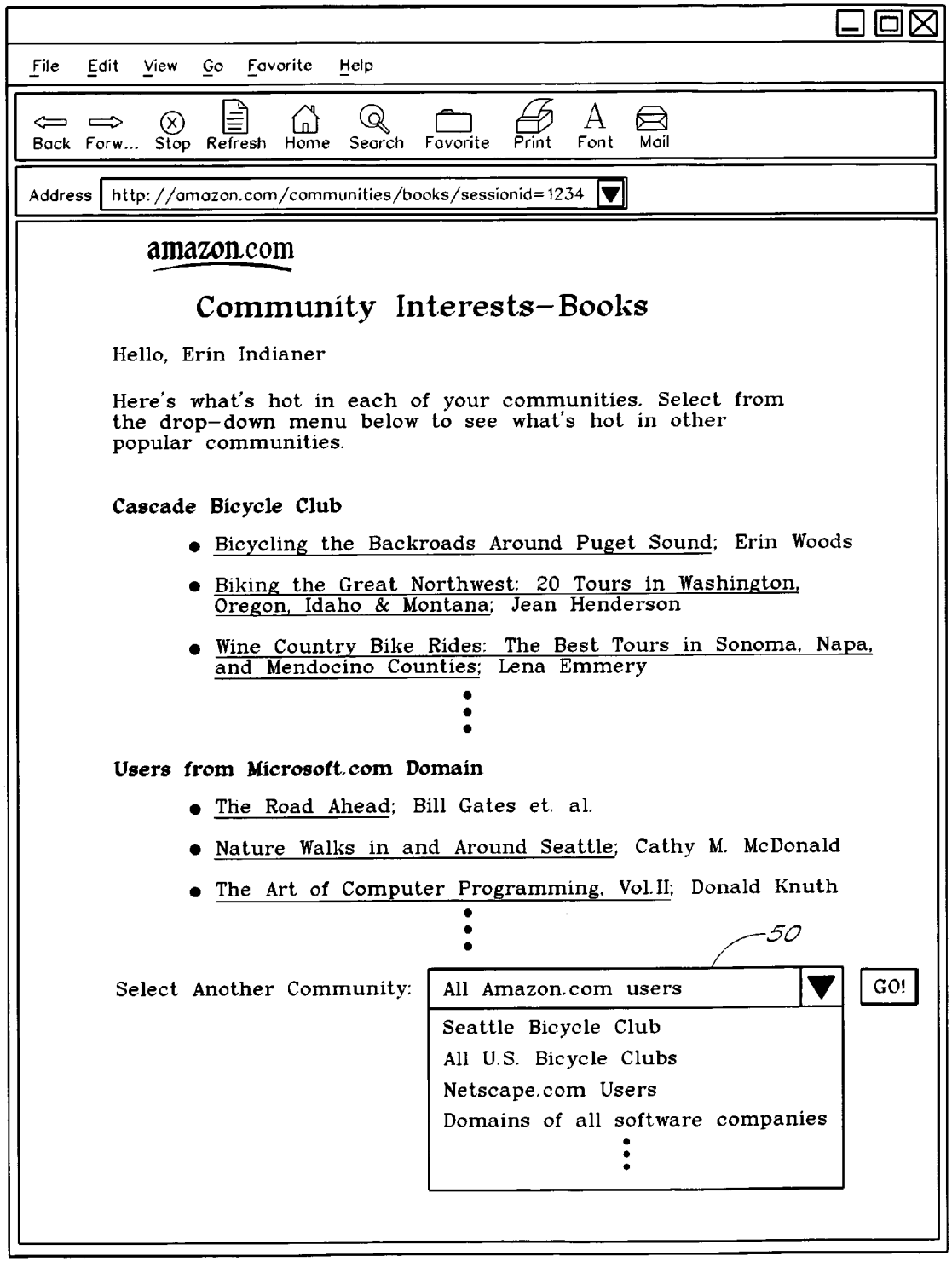
FIG. 2 illustrates a personalized community bestsellers page.

A set of online services referred to herein as "Community Interests" will now be described in detail. The services will initially be described with reference to example screen displays which illustrate the services from the perspective of end users. A set of example data structures and executable components that may be used to implement the services will then be described with reference to architectural and flow diagrams.

The illustrated screen displays, data structures and processing methods used to implement the disclosed functions are largely a matter of design choice, and can be varied significantly without departing from the scope of the invention. In addition, although multiple different services will be described as part of a single system, it will be recognized that any one of these services could be implemented without the others. Accordingly, the scope of the invention is defined only by the appended claims.

To facilitate an understanding of one practical application, the Community Interests services will be described primarily in the context of a hypothetical system for assisting users of a merchant Web site, such as the Web site of Amazon-.com, in locating and evaluating book titles within an electronic catalog. It will be recognized, however, that the services and their various features are also applicable to the marketing and sales of other types of items. For example, in other embodiments, the items that are the subject of the services could be cars sold by an online car dealer, movies titles rented by an online video store, computer programs or informational content electronically downloaded to users' computers, or stock and mutual fund shares sold to online investors. Further, it should be understood that the "purchases" referred to herein need not involve an actual transfer of ownership, but could rather involve leases, licenses, rentals, subscriptions and other types of business transactions.

As with the Amazon.com Web site, it will be assumed that the hypothetical Web site provides various services for allowing users to browse, search and make purchases from a catalog of several million book, music and video titles. It is also assumed that information about existing customers of the site is stored in a user database, and that this information typically includes the names, shipping addresses, email addresses, payment information and purchase histories of the customers. The information that is stored for a given customer is referred to collectively as the customer's "user profile."

The Community Interests services operate generally by tracking purchases of books within particular user communities, and using this information to assist potential customers in locating and evaluating book titles. The services can also be used with other types of products. The communities preferably include both "explicit membership communities" that users actively join, and "implicit membership communities" that are computed or otherwise identified from information known about the user (e.g., stored in the user database). Examples of implicit membership communities include domain-based communities such as Microsoft.com Users and geographic region base communities such as New Orleans Area Residents; memberships to these two types of communities may be determined from user email addresses and shipping addresses, respectively.

The system may also use implicit membership communities for which membership is based in-whole or in-part on the purchase activities of the users. For example, the implicit membership community "fishermen" may include all users that have purchased a book about fishing. Where purchase histories are used, the communities may be defined or inferred from such purchase histories using clustering techniques.

In other embodiments, the various features of the invention may be implemented using only one of these two types of communities (explicit membership versus implicit membership). In addition, the services may be implemented using "hybrid" communities that are based on information known about the user but that are actively joined; for example, the user could be notified that a community exists which corresponds to his email domain or purchase history and then given the option to join.

The Community Interests system includes four different types of services. The first, referred to herein as "Community Bestsellers," involves generating and displaying lists of the bestselling titles within specific communities. Using this feature, users can identify the book titles that are currently the most popular within their own communities and/or other communities. The bestselling titles are preferably identified based on the numbers of units sold, but could additionally or alternatively be based on other sales related criteria. In other embodiments, the lists may be based in-whole or in-part on other types of data, such as user viewing activities or user submissions of reviews and ratings.

One preferred method that may be used to identify bestselling or popular titles involves monitoring the "velocity" of each product (the rate at which the product moves up a bestsellers list) or the "acceleration" of each product (the rate at which the velocity is changing, or at which sales of the product are increasing over time). This method tends to surface products that are becoming popular. To identify the popular items within a particular community, the velocity or acceleration of each product purchased within that community can be compared to the product's velocity or acceleration within the general user population. Velocity and acceleration may be used both to generate bestseller lists and to identify "hot" products to proactively recommend to users (as discussed below).

The second service, referred to herein as "Contact Information Exchange," involves informing a user that is viewing a particular product of other users within the same community that have purchased the same or a similar product. For example, when a user within Netscape.com Users views a product detail page for a particular book on programming, the page may include the names and email addresses of other Netscape.com users that have recently purchased the title, and/or an instant messaging box for sending a message to any such user that is currently online. To protect the privacy of the recent purchasers, their names and/or email addresses may be masked, in which case an email alias or a bulletin board may be provided for communicating anonymously. This feature may also be used to display the contact information of other users that have bought from or otherwise conducted business with a particular seller.

The third service, referred to as "Hotseller Notification," automatically notifies users of titles that have become unusually popular within their respective communities. For example, a user within a particular hiking club might be notified that several other users within his club have recently purchased a new book on local hiking trails. In one embodiment, a community's "hotsellers" are identified by comparing, for each title on the community's bestseller list, the title's popularity within the community to the title's popularity within the general user population. The popularities of the titles are preferably based at least in-part on numbers of units sold, but may be additionally or alternatively be based other types of criteria such as user viewing activities or user submissions of reviews and ratings.

One such method that may be used to identify the hotsellers (or for generating community recommendations in general) involves applying an algorithm referred to as the censored chi-square recommendation algorithm to the purchase or other history data of users. The effect of the censored chi-square recommendation algorithm (when applied to purchase history data) is to identify a set of "characterizing purchases" for the community, or a set of items purchased within the community which distinguishes the community from a general user population (e.g., all customers). The results of the algorithm may be presented to users in any appropriate form, such as a community popular items list, a notification email, or a set of personal recommendations. The censored chi-square algorithm is described in the attached appendix, which forms part of the disclosure of the specification. Another such method that may be used to identify the community hotsellers involves comparing each title's velocity or acceleration within the community to the titles's velocity or acceleration within the general user population.

A fourth service, referred to as "Purchase Notification," automatically notifies users of purchases (including titles and the contact information of the purchaser) made within their respective communities. This service may, for example, be made available as an option where the community members have all agreed to share their purchase information. Alternatively, users may have the option to expose their purchases to other community members on a user-by-user and/or item-by-item basis.

FIG. 1 illustrates the general form of a sign-up page that can be used to enroll with the Community Interests services. Although some form of enrollment is preferred, it will be recognized that Community Bestsellers, Hotseller Notification, Contact Information Exchange and Purchase Notification services can be implemented without requiring any active participation by the site's users. For example, all four services could be based solely on the Internet domains of the users, without requiring users to actively join communities. In addition, the communities could be defined automatically based on correlations between purchases; for example, all users that purchased more than X books within the "Business and Investing" category could automatically be assigned to a Business and Investing community.

As illustrated by FIG. 1, the sign-up page includes drop-down lists 30 for allowing the user to specify membership in one or more explicit membership communities. The communities that are presented to the user are those that are currently defined within the system. As described below, new communities may be added by system administrators, regular users, or both. In some cases, the drop-down lists 30 may be filtered lists that are generated based on information known about the particular user. For example, the selections presented in the "local community groups" and "local outdoors clubs" lists may be generated based on the user's shipping address.

Any of a variety of other interface methods could be used to collect community membership information from users. For example, rather that having the user select from a drop-down list, the user could be prompted to type-in the names of the communities to which the user belongs. When a typed-in name does not match any of the names within the system, the user may be presented with a list of "close matches" from which to choose. Users may also be provided the option of viewing the membership lists of the communities and specifying the users with which to share information.

As illustrated by the link 32 and associated text in FIG. 1, users may also be given the opportunity to add new communities to the system. In the illustrated embodiment, a user wishing to add a new community has the option of designating the community as "private," meaning that the community's existence and/or data will not be exposed to the general public. Private communities may be useful, for example, when a closed group of users wishes to privately share information about its purchases. Upon creating a private community, the user may, for example, be prompted to enter the email addresses of prospective members, in which case the system may automatically send notification emails to such users. Through a similar process, companies and organizations may be provided the option of designating their domain-based communities as private.

The sign-up page also includes check boxes 36–38 for allowing users to participate in the Contact Information Exchange, Hotseller Notification, and Purchase Notification services, respectively. In each case, the user may select a corresponding link 40–42 to an associated form page (not shown) to limit participation to specific communities and/or product categories. Each user may also be given the option to expose his or her purchases and/or contact information to others on a user-by-user basis.

When the user selects the submit button 46, the user may be asked certain questions that pertain to the selected communities, such as university graduation dates and majors. The user may also be prompted to enter authentication information that is specific to one or more of the selected communities. For example, the user may be asked to enter a community password (even if the community is not private), or may be asked a question that all members of the group are able to answer. A community may also have a designated "group administrator" that has the authority to remove unauthorized and disruptive users from the group.

The user's community selections, community data, and service preferences are recorded within the user's profile. Also stored within the user's profile are any domain-based or other implicit membership communities of which the user is a member. The user's community membership profile may also be recorded within a cookie on the user's machine; this reduces the need to access the user database on requests for Web pages that are dependent on this membership profile. One method which may be used to store such information within cookies is described in U.S. provisional appl. No. 60/118,266, the disclosure of which is hereby incorporated by reference.

FIG. 2 illustrates the general form of a personalized Web page (referred to herein as the "community bestsellers page") which may be used to display the community bestseller lists. This page may be accessed, for example, by selecting a link from the site's home page. Community bestseller lists could additionally or alternatively be provided on other areas of the site. For example, the bestseller list of the Nasa.com domain could automatically be displayed on the home page for any user that has purchased a book on space exploration; or, when a user from the domain mckinsey.com makes a purchase, the user might be presented the message "would you like to see the bestsellers from the McKinsy & Co. group?"

In the FIG. 2 example, it is assumed that the user is a member of the explicit membership community Cascade Bicycle Club and the implicit membership community Microsoft.com Users. For each of these communities (as well as any other communities of which the user is a member), the page includes a hypertextual listing of top selling book titles. The methods used to generate these lists are described below. Users may also be given the option (not shown) to view all titles purchased within their respective communities.

As depicted by the drop-down list 50 in FIG. 2, the user may also be provided the option of viewing the bestseller lists of other communities, including communities of which the user is not a member. As in this example, the listing of other communities may be ordered according to the known or predicted interests of the user. A community directory structure or search engine may also be provided for assisting users in finding communities and their bestseller lists.

As further illustrated by FIG. 2, some of the communities may be "composite" communities that are formed as the union of other, smaller communities. In this example, the composite communities are All U.S. Bicycle Clubs, which consists of all regional and other bicycle club communities in the U.S., and Domains of All Software Companies, which consists of domains-based communities of selected software companies. Other examples include All Law Students and All Physicians. Bestseller lists for composite communities are particularly helpful for identifying book titles that are popular across a relatively large geographic region. For example, a user searching for a book on biking the United States, or on biking in general, would more likely find a suitable book in the All US. Bicycle Clubs bestseller list than in the Cascade Bicycle Club bestseller list.

In the preferred embodiment, a user can be a member of a composite community only through membership in one of that composite community's member, base communities. (A "base community," as used herein, is any non-composite community, regardless of whether it is part of a composite community.) The composite communities that are exposed to the general user population could be defined by system administrators; alternatively, the composite communities could be defined automatically, such as by grouping together all base communities that have certain keywords in their titles.

In one implementation, users can also define their own, "personal" composite communities, such as by selecting from a list (not shown) of base communities and assigning a community name. Using this feature, a user could, for example, define a composite community which consists of all kayaking clubs on the West Coast or of a selected group of hi-tech companies. If the user has defined a personal composite community, that community's bestseller list is preferably automatically displayed on the user's community bestsellers page (FIG. 2). As with the user's community membership profile, the definitions of any personal composite communities specified by the user may be stored within a cookie on the user's machine.

As further illustrated by FIG. 2, users can also view a bestseller list of the general user population (e.g., all Amazon.com users). The general user population is treated as special type of community (i.e., it is neither a base community nor a composite community), and is referred to herein as the "global community."

Another option (not illustrated) involves allowing users to specify subsets of larger communities using demographic filtering. For example, a user within the MIT community might be given the option to view the bestselling titles among MIT alumnus who fall within a particular age group or graduated a particular year.

Figure 3:
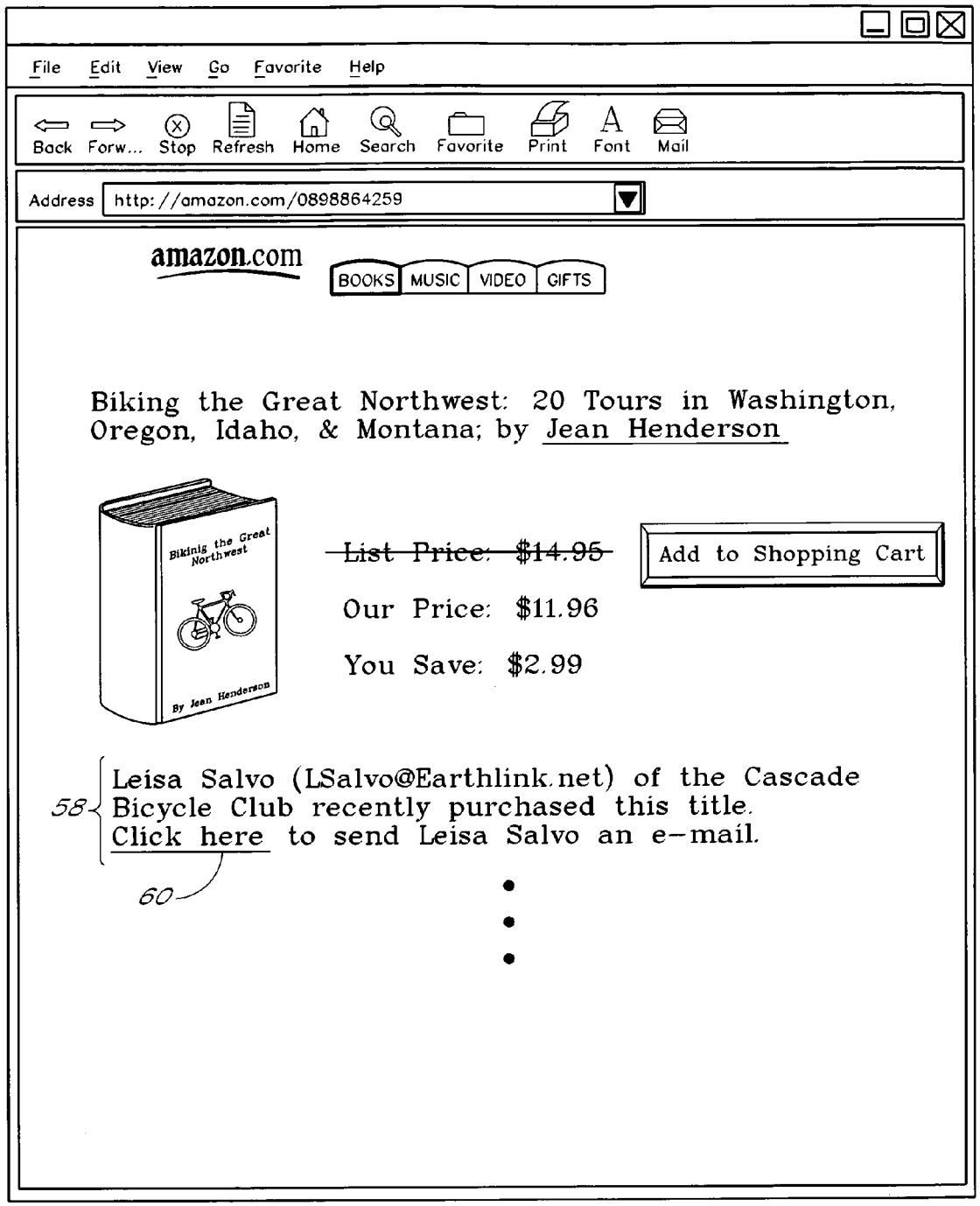
FIG. 3 illustrates an example product (book) detail page which includes contact information of other community members that have purchased the product.

FIG. 3 depicts an example product (book) detail page which illustrates one possible form of the Contact Information Exchange service. Detail pages of the type shown in FIG. 3 can be located using any of a variety of navigation methods, including performing a book search using the site's search engine or navigating a subject-based browse tree. The contact information 58 of other community members that purchased the displayed book title (preferably within a certain period of time), or possibly similar titles, is displayed at the bottom of the page. In other embodiments, the contact information may be displayed without regard to community membership.

In the illustrated embodiment, the contact information 58 includes the name, email address and common communities of the users, although telephone numbers, residence addresses, chat boxes and other types of contact information could additionally or alternatively be included. In the example shown in FIG. 3, the user viewing the book detail page might contact such other users to ask their opinions about the book, or about the bike tours described therein. In addition, the contact information might be useful for arranging a group trip. As depicted in FIG. 3, the page may also include a link 60 or other type of object for sending an email or other message to the fellow community member.

In one embodiment (not illustrated), once the relevant set of "prior purchasers" has been identified, the system uses well known methods to determine whether any of these other users is currenly online. If one or more of the prior purchasers is online, the user is presented an option to send an instant message to prior purchaser(s), and/or to set up a private chat room for communicating with prior purchasers. Thus, the contact information may simply be in the form of an instant messaging box or other option for chatting online with specific users.

In other embodiments, the various contact information exchange features may be used to assist users in evaluating the reputation of a particular merchant. For example, when a user views an auction of a particular seller, the contact information of other community members (or possibly non-community members) that bought from that seller may be displayed, or an option could be provided to chat with any such users that are currently online. Where the merchant has its own Web site, the contact information could, for example, be displayed as Web site metadata using a browser add-on of the type provided by Alexa Internet of San Francisco, Calif.

Any of a variety of methods could be used for allowing the prospective purchaser to communicate with the listed contacts anonymously. For example, as indicated above, the email addresses of the contacts could be special aliases created for communicating anonymously (in which case the prospective purchaser may similarly be assigned an email alias for the contacts to respond), or the prospective purchaser and the contacts could be given a link to a private bulletin board page.

Figure 4:
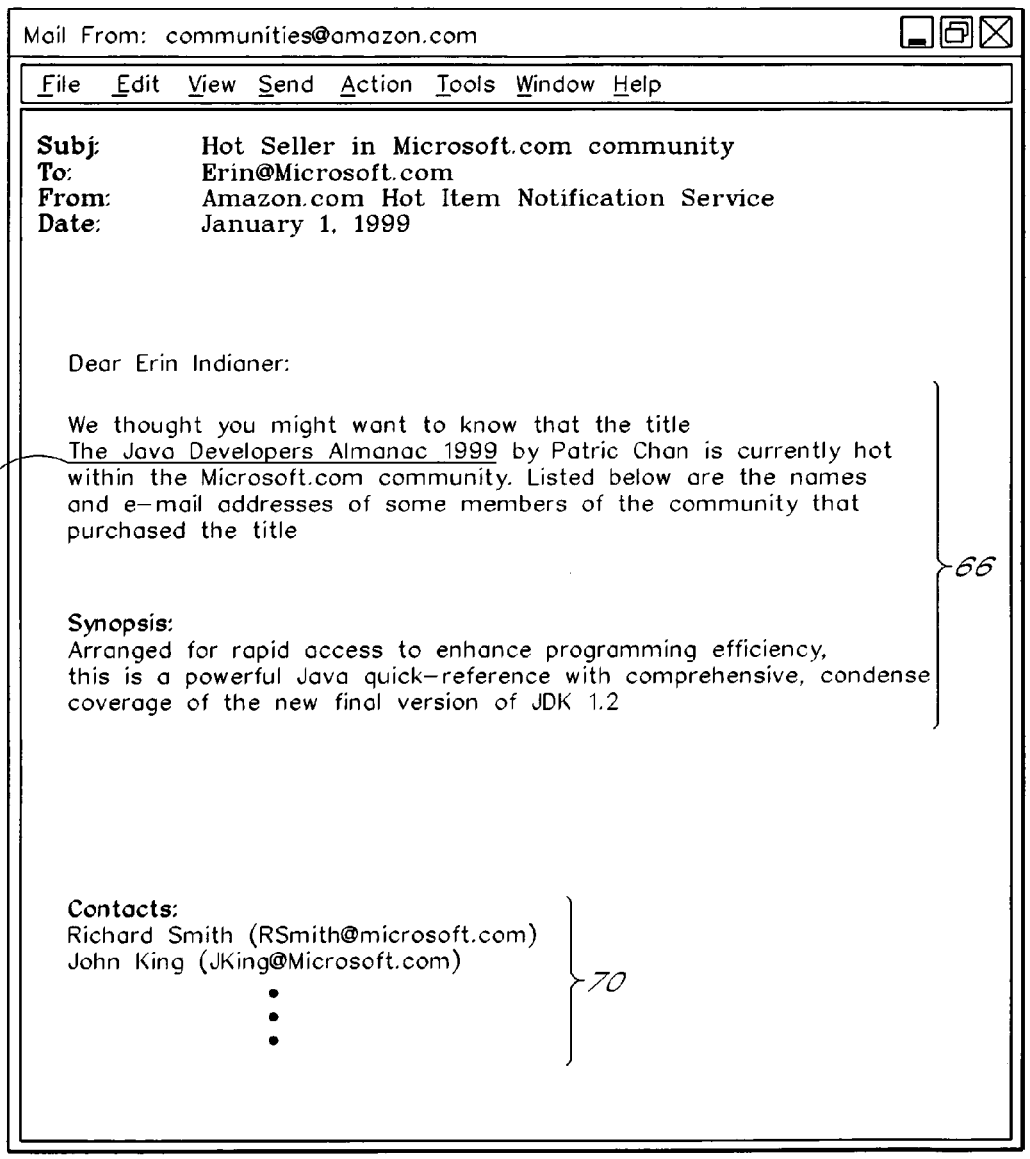
FIG. 4 illustrates an example hotseller notification email message.

FIG. 4 illustrates an example of an email document which may be used to notify community members of a hotselling book title. Similar notifications may be provided to users through customized Web pages and other communications methods. As described below, the email document is preferably sent to all participating members of the community that have not already purchased the book.

In the illustrated example, the email document includes a textual description 66 which, among other things, includes a synopsis of the book title and informs the user of the level of acceptance the title has attained within the community. The description also includes a hypertextual link 68 to the title's detail page on the site. In addition, if the recipient user participates in the Contact Information Exchange program, the email document preferably includes a listing 70 of the contact information of other community members that have purchased the book.

Email notifications sent by the Purchase Notification service (not shown) may likewise include a synopsis of the purchased product and a link to the product's detail page. In addition, where the purchaser has elected to participate in the Contact Information Exchange program, the email document may include the purchaser's contact information (and possibly the contact information of other community members who have purchased the product); for example, when User A in Community A purchases an item, an email may be sent to other members of Community A with a description of the product and User A's contact information.

Having described representative screen displays of the Community Interests services, a set of Web site components that may be used to implement the services will now be described in detail.

Figure 5:
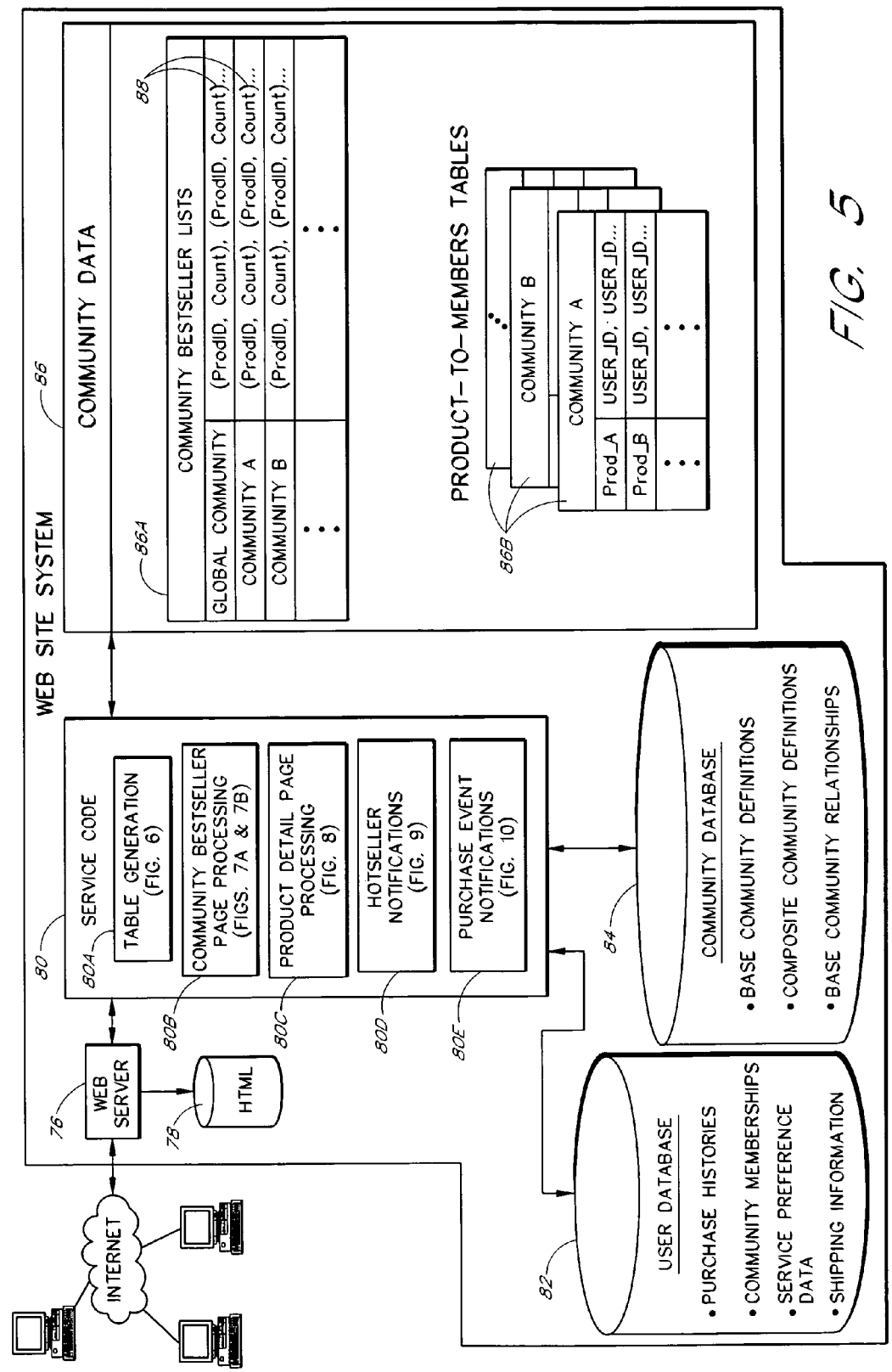
FIG. 5 is an architectural drawing which illustrates a set of components which may be used to implement the community bestseller lists, hotseller notification, and contact information exchange services.

FIG. 5 illustrates a set of Web site system components that may be used to implement the above-described features. The Web site system includes a Web server 76 which accesses a database 78 of HTML (Hypertext Markup Language) and related content. The HTML database 78 contains, among other things, the basic HTML documents used to generate the personalized sign-up, community bestsellers, and product detail pages of FIGS. 1–3. The Web server 76 accesses service code 80, which in-turn accesses a user database 82, a community database 84, a bibliographic database of product data (not shown), and a database or other repository of community data 86. The various databases are shown separately in FIG. 5 for purposes of illustration, but may in practice be combined within one or more larger database systems. The service code 80 and other executable components may, for example, run on one or more Unix or Windows NT based servers and/or workstations.

The community data 86 includes a "community bestseller lists" table 86A which contains, for the global community and each base community, a listing of the currently bestselling book titles. In some implementations, the listing for the global community is omitted. In the illustrated embodiment, each entry 88 in each bestseller list includes: (a) the product ID (ProdID) of a book title, and (b) a count value which represents, for a given time window, the number of copies purchased by members of the community. The product IDs may be assigned or processed such that different media formats (e.g., paperback, hardcover, and audio tape) of the same title are treated as the same item. As described below, the community bestseller lists table 86A is used both for the generation of bestseller lists and the generation of hotseller notifications.

The community data 86 also includes, for each base community, a respective product-to-member mapping table 86B which maps products to the community members that have recently purchased such products (e.g., within the last 2 months). For example, the entry for product Prod_A within the table 86A for Community A is in the form of a listing of the user IDs and/or contact information of members of Community A that have recently purchased that product. In the preferred embodiment, only those community members that have opted to participate in the Contact Information Exchange service are included in the lists.

As mentioned above, the user database 82 contains information about known users of the Web site system. The primary data items that are used to implement the Community Interests service, and which are therefore shown in FIG. 5, are the users' purchase histories, community memberships, service preference data (e.g., whether or not the user participates in the Contact Information Exchange and Hotseller Notification services), and shipping information. Each user's purchase history is in the general form of a list of product IDs of purchased product, together with related information such as the purchase date of each product and whether or not the purchase was a designated by the user as a "gift." Purchases designated as gifts may be ignored for purposes of evaluating community interests. Each user's database record also preferably includes a specification of any personal composite communities the user has defined, for viewing customized bestseller lists.

With further reference to FIG. 5, the community database 84 contains information about each base community (including both explicit and implicit membership base communities when both types are provided) that exists within the system. This information may include, for example, the community name, the type of the community (e.g., college/university, local community group, etc.), the location (city, state, country, etc.) of the community, whether the community is private, whether the community participates in the Purchase Notification service, any authentication information required to join the community, and any community policies (e.g., by joining, all users agree to expose their purchases to other members). For implicit membership communities, the database 84 may also include information about the user database conditions which give rise to membership. As indicated above, the information stored within the communities database 84 may be generated by end users, system administrators, or both.

The community database 84 also includes information about any composite communities that have been defined by system administrators. For each composite community, this information may include, for example, the community name and a list of the corresponding base communities. For example, for the All Bicycle Clubs community, the database would contain this name and a list of all existing bicycle club base communities.

As depicted by FIG. 5, the community database 84 may also contain information about relationships or associations between base communities. This information may be specified by system administrators, and may be used to identify similar communities for display purposes. For example, when a user of the Microsoft.com Users community views the community bestsellers page (FIG. 2), the associated community Netscape.com Users may automatically be displayed at the top of the drop-down list 50, or its bestseller list be displayed on the same page.

As illustrated by FIG. 5, the service code 80 includes five basic processes 80A–80E that are used to implement the Community Interests services. (As used herein, the term "process" refers to a computer memory having executable code stored therein which, when executed by a computer processor, performs one or more operations.) Each process is illustrated by one or more flow diagrams, the figure numbers of which are indicated in parenthesis in FIG. 5. The first process 80A is an off-line process (meaning that it is not executed in response to a page request) which is used to periodically generate the tables 86A and 86B based on information stored in the user and community databases 82, 84. Processes 80B–80D use these tables to perform their respective functions.

The second process 80B is an online process which is used to generate personalized community bestsellers pages of the type shown in FIG. 2. The third process 80C is an online process which is used to generate product detail pages with contact information as shown in FIG. 3; and which may also be used to compile contact information to be displayed within notification emails of the type shown in FIG. 4. The fourth process 80D is an offline process which is used to identify and notify users of hotselling products within specific communities. The fifth process 80E is used to implement the Purchase Notification service.

Figure 6:
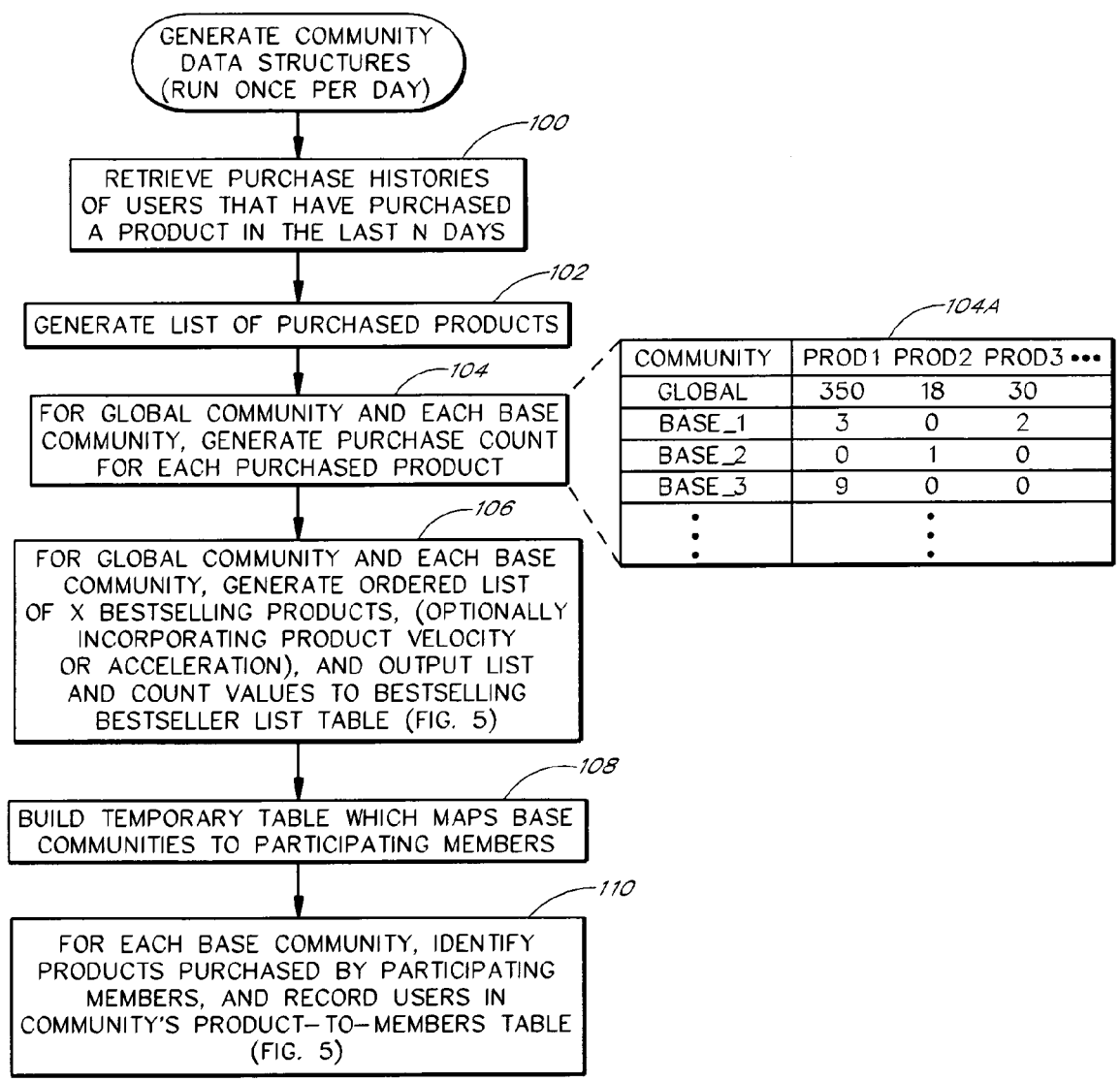
FIG. 6 illustrates an offline process for generating the community bestseller lists table and the product-to-member tables of FIG. 5.

FIG. 6 illustrates the steps performed by the table generation process 80A to generate the tables 86A, 86B. The process may, for example, be executed once per day at an off-peak time. A process which updates the tables in real-time in response to purchase events may alternatively be used. In step 100, the process retrieves the purchase histories of all users that have purchased products within the last N days (e.g., 60 days). Submissions of ratings or reviews may be treated as purchases and thus included in the purchase histories. The variable N specifies the time window to be used both for generating bestseller lists and for identifying hotselling items, and may be selected according to the desired goals of the service. Different time windows could alternatively be used for generating the bestseller lists and for identifying hotselling items; and different time windows could be applied to different types of communities.

In step 102, the retrieved purchase histories are processed to build a list of all products that were purchased within the last N days. Preferably, this list includes any products that were purchased solely by global community members, and thus is not limited to base community purchases.

In step 104, the process uses the data structures obtained from steps 100 and 102 to generate a temporary purchase count array 104A. Each entry in the array 104A contains a product count value which indicates, for a corresponding community:

product pair, the number of times the product was purchased by a member of the community in the last N days. For example, the array 104A shown in FIG. 6 indicates that a total of 350 users purchased product "PROD1," and that three of those purchases came from base community "BASE_1." A pseudocode listing of a routine that can be used to generate the array is shown in Table 1. Multiple purchases of the same product by the same user are preferably counted as a singe purchase when generating the array.

TABLE 1

For each user;
    For each product purchased by user in last N days;
        For each community of which user is a member;
            increment purchase_count(community, product)

In step 106, the data stored in the array is used to generate the community bestseller lists. This task involves, for each base community and the global community, forming a list of the purchased products, sorting the list according to purchase counts, and then truncating the list to retain only the X (e.g., 100) top selling titles. A longer bestsellers list (e.g., the top selling 10,000 titles) may be generated for the global community, as is desirable for identifying community hotsellers.

As indicated by the parenthetical in block 106, product velocity and/or acceleration may be incorporated into the process. The velocity and acceleration values may be calculated, for example, by comparing purchase-count-ordered lists generated from the temporary table 104A to like lists generated over prior time windows. For example, a product's velocity and acceleration could be computed by comparing the product's position within a current purchase-count-ordered list to the position within like lists generated over the last 3 days. The velocity and acceleration values can be used, along with other criteria such as the purchase counts, to score and select the products to be included in the bestseller lists.

The bestseller lists are written to a table 86A of the type depicted in FIG. 5, and the new table replaces any existing table. The bestsellers lists of base communities that have less than a pre-specified threshold of total sales (e.g., less than 5) may optionally be omitted from the table 86A. Bestseller lists for the composite communities defined by system administrators could also be generated as part of the FIG. 6 process, or could be generated "on-the-fly" as described below.

The last two steps 108, 110 of FIG. 6 are used to generate the product-to-member mapping tables 86B of FIG. 5. The first step 108 of this process involves generating a temporary table (not shown) which maps base communities to corresponding members that have opted to participate in the Contact Information Exchange program ("participating members"). In step 110, this temporary table and the purchase histories of the participating members are used to generate the product-to-member mapping table 86B for each base community. The contact information of the participating members may also be stored in these tables 86B to reduce accesses to the user database 82. Although a separate table 86B is preferably generated for each base community, a single table or other data structure could be used.

Any of a variety of other types of user activity data could be monitored and incorporated into the FIG. 6 process as a further indication of product popularity. Such data may include, for example, "click-through" events to product detail pages, "add to shopping cart" events, and product ratings and reviews submitted by users.

Figure 7A:
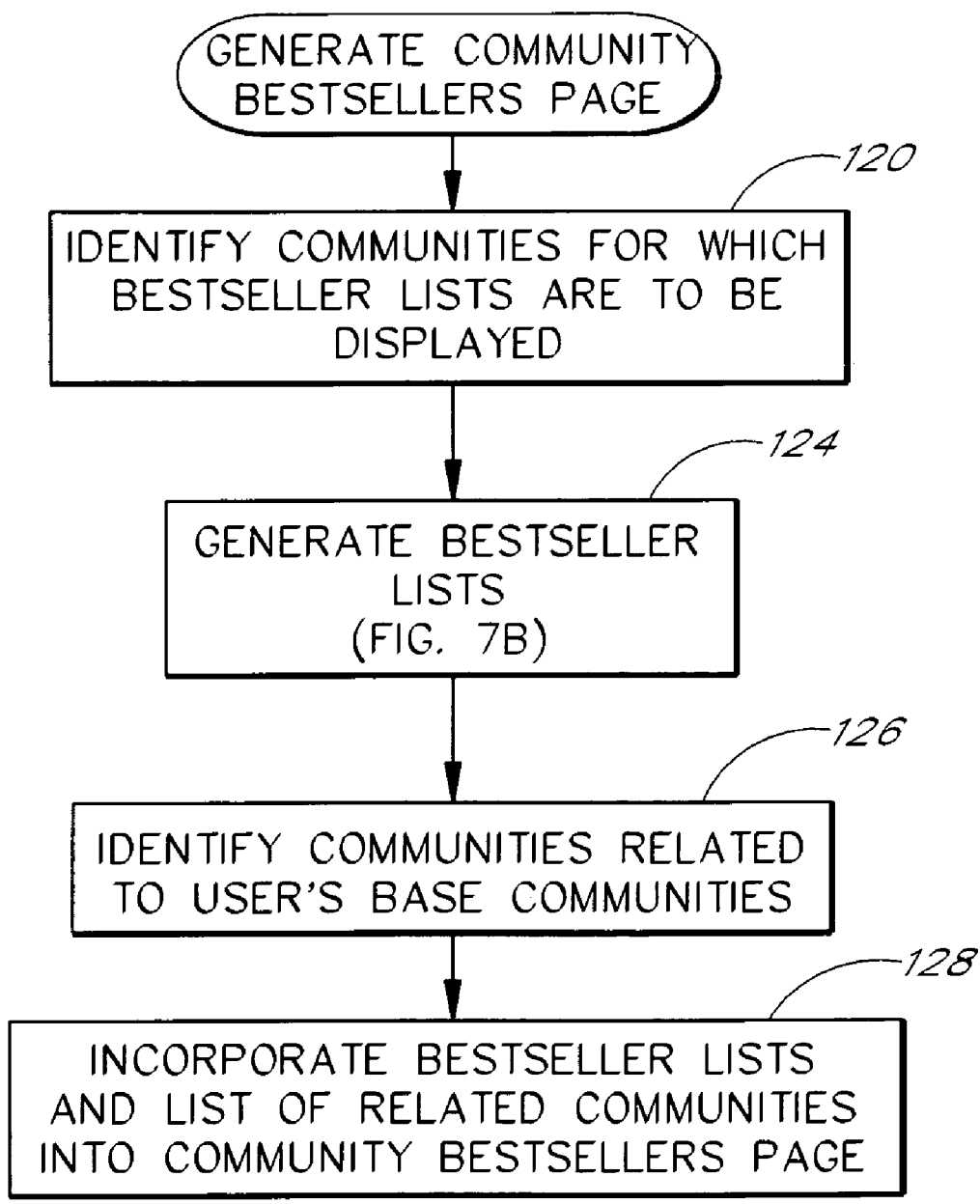
FIGS. 7A and 7B illustrate an online (real time) process for generating personalized community bestseller pages of the type shown in FIG. 2.
Figure 7B:
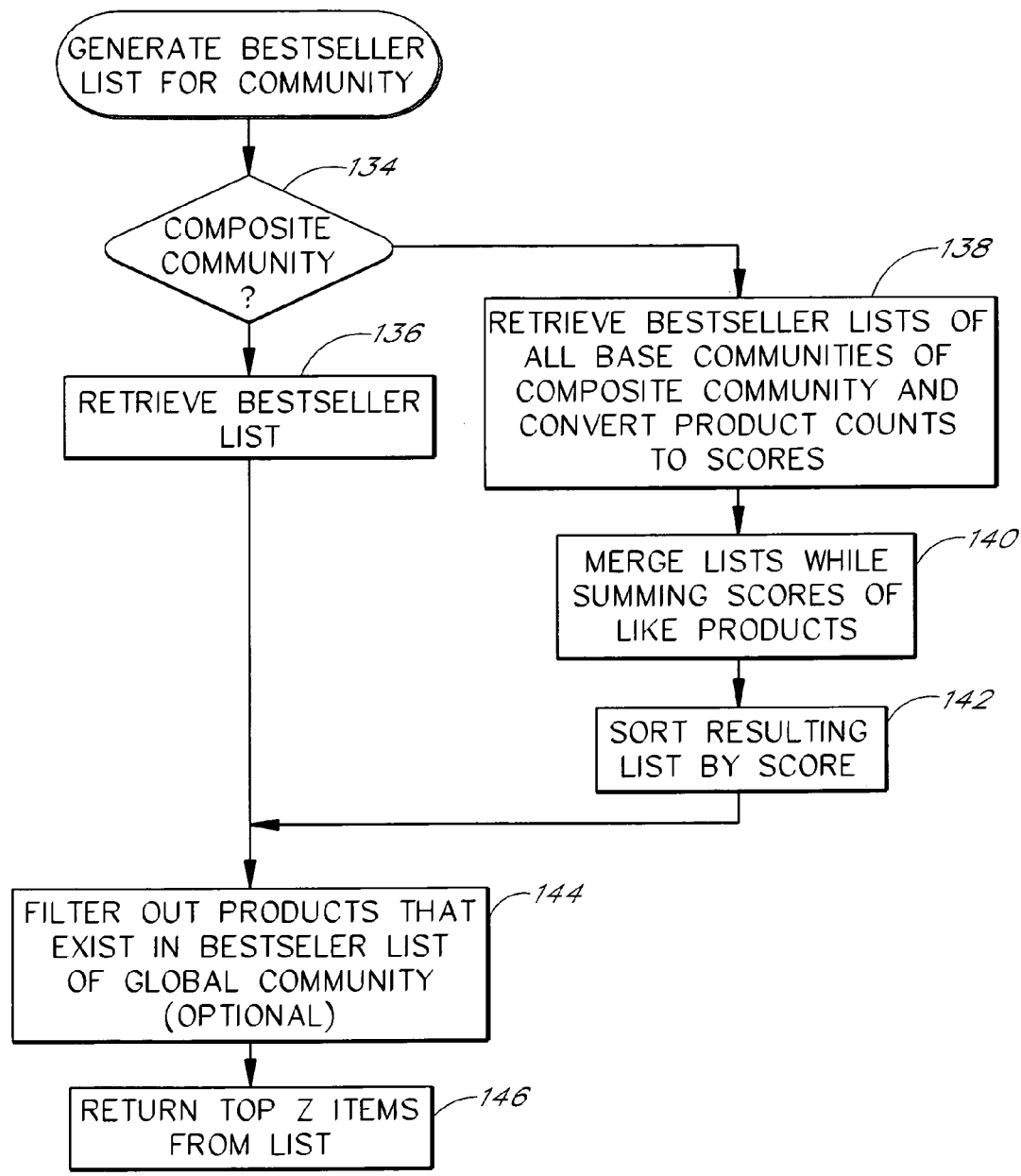

FIGS. 7A and 7B illustrate the steps that are performed by the community bestseller processing code 80B to generate personalized community bestseller pages of the type shown in FIG. 2. The first step 120 in FIG. 7A involves generating a list of the communities for which bestseller lists are to be generated and displayed. If the user has already selected one or more communities from the drop down box 50 (FIG. 2), these selected communities are included in this list. If the user's identity is known, the user's base communities and personal composite communities, if any, may be added to this list. If the list is empty at this point, a set of default communities may used. User identities are preferably determined using browser cookies, although a login procedure or other authentication method could be used. In other implementations, the community bestseller lists may be displayed without regard to the user's community membership profile.

The next step 124 involves generating the bestseller lists for each of the selected communities. This process is illustrated by FIG. 7B and is described below. In step 126, the process identifies any communities that are related to the user's base communities, so that these related communities can be displayed within or at the top of the drop-down list 50 (FIG. 2). Any composite community which includes one of the user's base communities may automatically be included in this list. In addition, information stored in the community database 84 may be used to identify related base communities. In other implementations, this step 126 may be omitted. Finally, in step 128, the bestseller lists and the list of related communities are incorporated into the community bestsellers page.

With reference to FIG. 7B, if the community is not a composite community (as determined in step 134), the community's bestseller list is simply retrieved from the table 86A (step 136). Otherwise, the bestseller lists of all of the composite community's member base communities are retrieved and merged (steps 138–142) to form the bestseller list. As part of the merging process, the product count values could optionally be converted to normalized score values (step 138) so that those communities with relatively large sales volumes will not override those with smaller sales volumes. For a given product within a given bestseller list, the score may be calculated as (product's purchase count)/ (total purchase count of bestseller list). The lists are then merged while summing scores of like products (step 140), and the resulting list is sorted from highest to lowest score (step 142). If the composite community is one that has been defined by system administrators (as opposed to a personal composite community defined by the user), the resulting bestseller list may be added to the table 86A or otherwise cached in memory to avoid the need for regeneration.

As depicted in step 144, one optional feature involves filtering out from the bestseller list some or all of the products that exist within the global community's bestseller list. For example, any book title that is within the top 500 bestseller's of the general population may automatically be removed. Alternatively, such titles could be moved to a lower position within the list. This feature has the effect of highlighting products for which a disparity exists between the product's popularity within the global community versus the community for which the bestseller list is being generated. This feature may be provided as an option that can be selectively enabled or invoked by users. Products could additionally or alternatively be filtered out based a comparison of the product's velocity or acceleration within the particular community to the product's velocity or acceleration within the global community.

As illustrated by step 146, the bestseller list is truncated (such as by taking the top 10 entries) and then returned to the process of FIG. 7A for incorporation into the Web page. The FIG. 7B process is repeated for each community to be included within the community bestsellers page.

Figure 8:
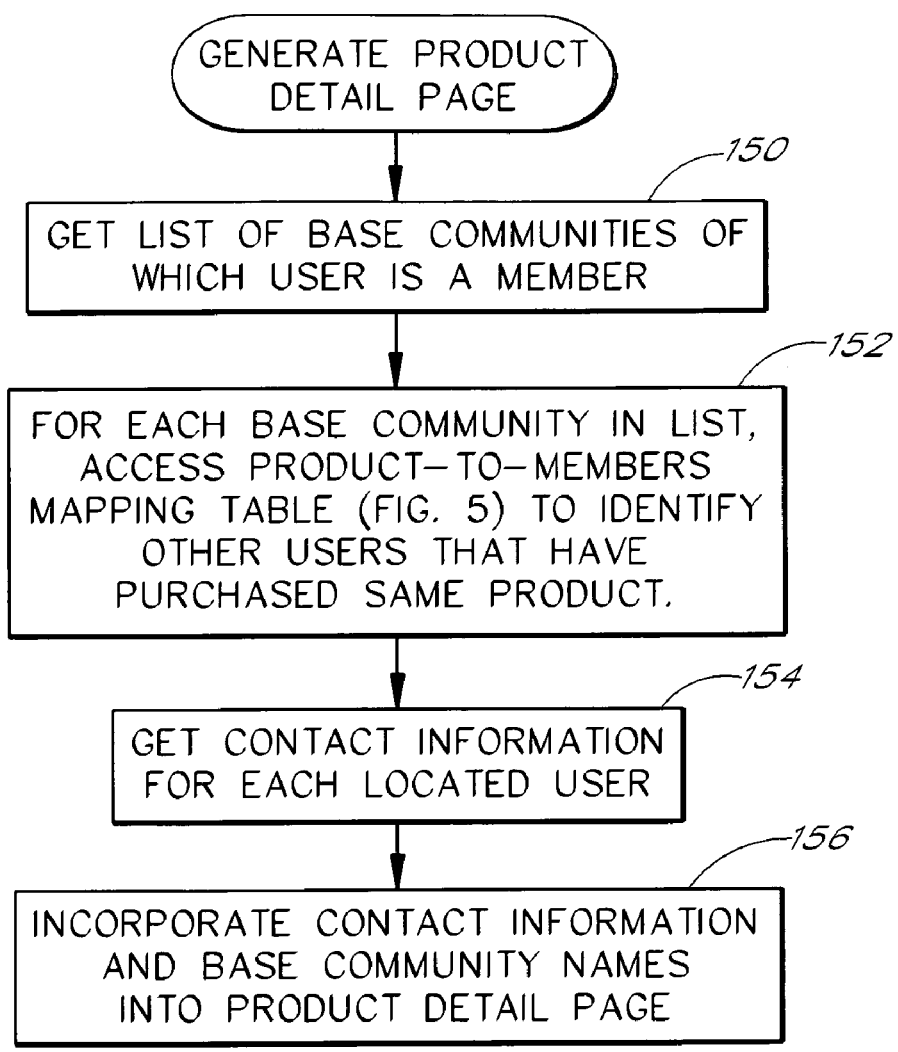
FIG. 8 illustrates an online process for generating personalized product detail pages of the type shown in FIG. 3.

FIG. 8 illustrates the steps that are performed by the product detail page process 80C to generate detail pages (as in FIG. 3) for participants in the Contact Information Exchange program. As indicated above, product detail pages can be accessed using any of the site's navigation methods, such as conducting a search for a title. In step 150, a list of the base communities of which the user is a member is obtained—either from a browser cookie or from the user database 82. In step 152, for each base community in this list, that community's product-to-member mapping table 86B (FIG. 5) is accessed to identify any other users within the community that have purchased the product. In step 154, the contact information for each such user is read from the table 86B or from the user database 82. In step 156, the contact information and associated base community names are incorporated into the product's detail page. As indicated above, an option may additionally or alternatively be provided for the requester of the page to chat with any such other users that are currently online.

Figure 9:
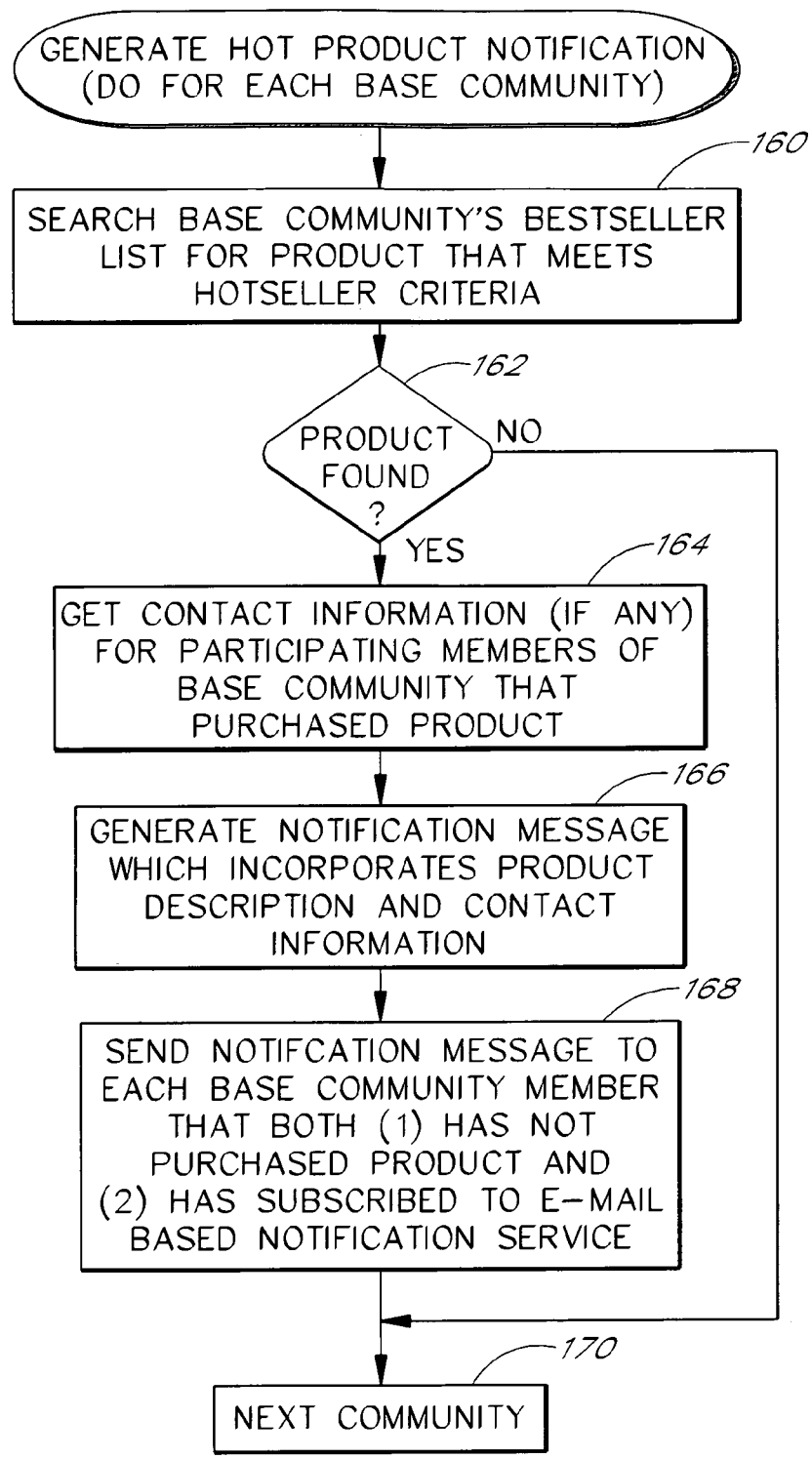
FIG. 9 illustrates an offline process for generating email notifications of hotselling products as in FIG. 4.

FIG. 9 illustrates the off-line sequence of steps that are performed by the hotseller notifications process 80D. The general purpose of this process is to identify, within each base community, any "hotselling" products (based on pre-specified criteria), and to call such products to the attention of those within the community that have not yet purchased the products. The sequence 160–168 is performed once for each base community. In other implementations, the process could also be used to identify hotsellers in composite communities.

In step 160, the process sequences through the products in the community's bestseller list while applying the hotseller criteria to each product. If multiple products qualify as hotsellers, only the "best" product is preferably selected. In one embodiment, a product is flagged as a hotseller if more than some threshold percentage (e.g., 5%) of the community's members have recently purchased the product, as determined from the data within the community bestseller lists table 86A. This threshold could be a variable which depends upon the number of members of the community.

In another embodiment, the position of the product within the community's bestseller list is compared to the product's position, if any, within the global community's bestseller list. For example, any title that is in one of the top ten positions within the community's list but which does not appear in the top 1000 bestsellers of the general population may automatically be flagged as a hotseller. In addition, as mentioned above, hotsellers may be identified by comparing the product's velocity or acceleration within the community to the product's velocity or acceleration within the global community. In addition, the censored chi-square algorithm described in the attached appendix may be used to identify the hotsellers. In other implementations, these and other types of conditions or methods may be combined.

If no hotseller is found for the community (step 162), the process proceeds to the next base community (step 170), or terminates if all base communities have been processed. If a product is found, the product-to-member mapping table 86B (FIG. 5) is accessed to identify and obtain the contact information of any participating members that have purchased the product (step 164). In step 166, the process generates an email document or other notification message. As in FIG. 4, this message preferably includes the contact information and a description of the product. In other implementations, the notifications may be communicated by facsimile, a customized Web page, or another communications method.

In step 168, the notification message is sent by email to each base community member who both (1) has not purchased the product, and (2) has subscribed to the email notification service. Such members may be identified by conducting a search of the user database 82. The notification messages could alternatively be sent out to all community members without regard to (1) and/or (2) above. For users that have not subscribed to the Contact Information Exchange service, the contact information may be omitted from the notification message.

Figure 10:
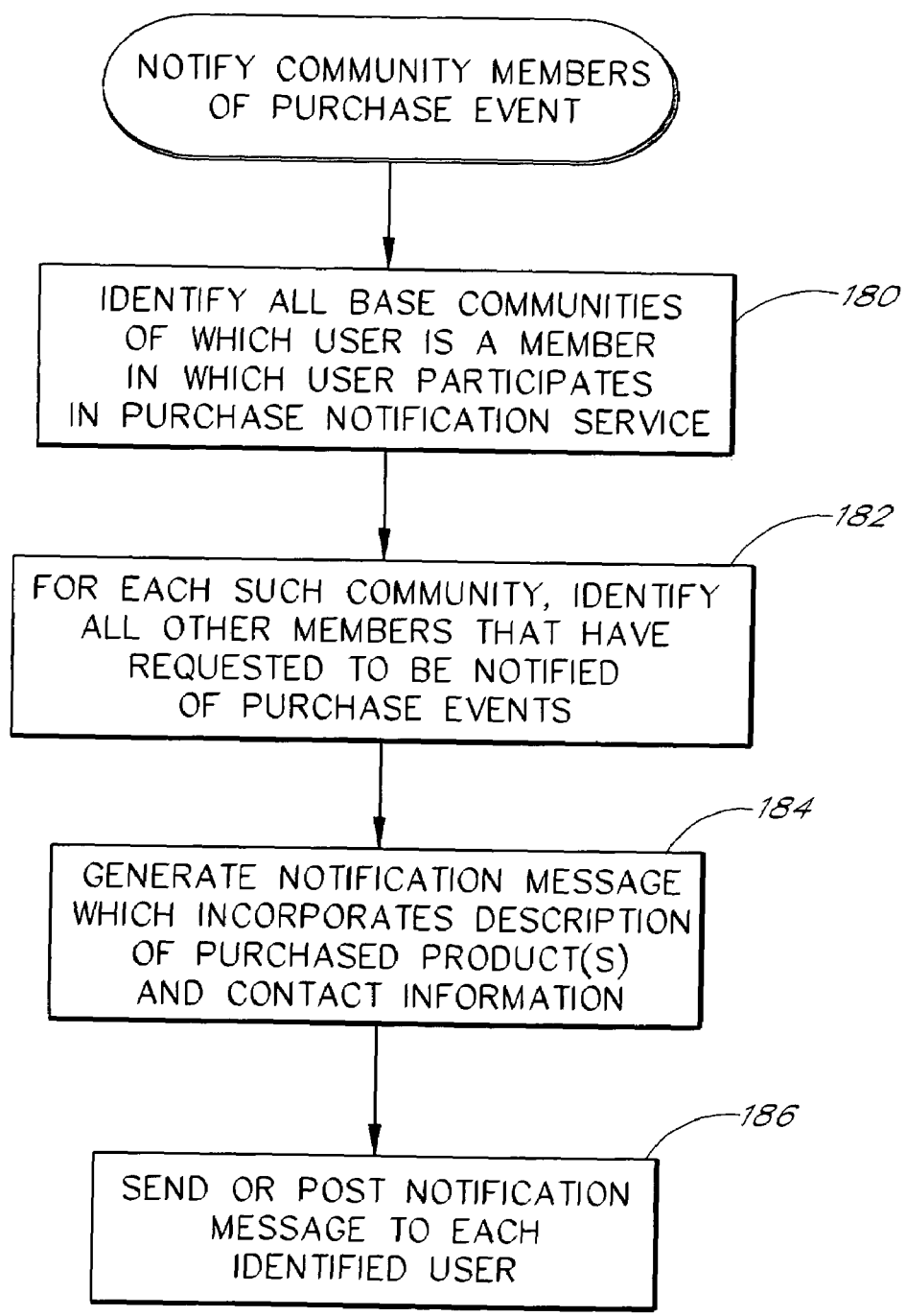
FIG. 10 illustrates a process for notifying community members of purchases made within the community.

FIG. 10 illustrates a sequence of steps that may be performed to implement the Purchase Notification service. This process may be implemented whenever a user completes the check-out process to purchase one or more products. In step 180, the user's profile is checked to identify any base communities in which the user participates in the Purchase Notification service. For each such community, all other participating members are identified in step 182. In step 184, a notification message is generated which includes a description of the purchased product(s) and the name of the common community. If the user participates in the Contact Information Exchange service, the contact information of the purchaser may also be included within this message. In step 186, the notification message is sent by email to all participating members identified in step 182. Alternatively, purchase notifications that have accumulated over a period of time may be displayed when a user logs into the system.

The various community-related features described above can also be implemented in the context of a network-based personal information management system. One such system is implemented through the Web site of PlanetAll (www-.planetall.com). Using this system, users can join various online communities and can selectively add members of such communities to a virtual, personal address book. In addition, each user can selectively expose his or her own personal information to other community members on a user-by-user and datum-by-datum basis. Additional details of this system are described in U.S. application Ser. No. 08/962,997 titled NETWORKED PERSONAL CONTACT MANAGER filed Nov. 2, 1997 (now U.S. Pat. No. 6,269, 369), the disclosure of which is hereby incorporated by reference.

In the context of this and other types of network-based address book systems, the contacts listed within a user's address book may be treated as a "community" for purposes of implementing the above-described features. For example, a user may be given the option to view the products purchased by other users listed in his or her address book (or a particular section of the address book), or to view a bestsellers list for such users. Further, when the user views a product detail page (or otherwise selects a product), the contact information of other users within the address book that bought the same product may be displayed. Further, a user may be given the option to conduct a search of a friend's address book to locate another user that purchased a particular product.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims.

What is claimed is:

1. A computer implemented method of assisting users in selecting items to purchase from an electronic catalog of items, the method comprising:

maintaining purchase history data for each of a plurality of users of the electronic catalog;

maintaining community data indicative of user memberships within specific explicit-membership communities that users explicitly join, wherein each of the explicit-membership communities represents a respective subset of a general user population;

monitoring online browsing of the electronic catalog by a first user who is a member of an explicit-membership community to detect that an item accessed by the first user has been purchased by a second user who is also a member of the explicit-membership community, as reflected by the purchase history data and the community data; and in response to detecting that the item has been purchased by the second user, supplementing a catalog page requested by the first user to include a notification that the item has been purchased by the second user, said catalog page being a page on which the item is displayed.

2. The method of claim 1, further comprising, in response to detecting that the item has been purchased by the second user, providing an option to the first user to send a message to the second user.

3. The method of claim 2, wherein providing an option to the first user comprises providing an option to send an instant message to the second user.

4. The method of claim 1, wherein the catalog page is an item detail page.

5. The method of claim 1, wherein the notification includes contact information of the second user.

6. The method of claim 1, wherein the community is a private community.

7. A computer implemented method of assisting users in selecting items to purchase from an electronic catalog of items, the method comprising:

maintaining purchase history data for each of a plurality of users of the electronic catalog;

maintaining personal address book data for each of a plurality of the users;

monitoring online browsing of the electronic catalog by a first user to detect that an item accessed by the first user has been purchased by a second user that is included in a personal address book of the first user, as reflected by the purchase history data and the personal address book data; and in response to detecting that the item has been purchased by the second user, supplementing a catalog page requested by the first user to include a notification that the item has been purchased by the second user;

wherein the method is performed by a server system that provides functionality for browsing and making purchases from the electronic catalog.

8. The method of claim 7, wherein the notification includes contact information of the second user.

9. The method of claim 7, further comprising, in response to detecting that the item has been purchased by the second user, providing an option to the first user to send a message to the second user.

10. The method of claim 7, wherein the catalog page is an item detail page.

* * * * *